March 8, 1932.  J. B. FULTON  1,848,216

AUTOMATIC TRANSMISSION MECHANISM

Filed Dec. 4, 1930  3 Sheets-Sheet 1

INVENTOR
John B. Fulton,
BY
ATTORNEYS

March 8, 1932.  J. B. FULTON  1,848,216
AUTOMATIC TRANSMISSION MECHANISM
Filed Dec. 4, 1930  3 Sheets-Sheet 2

INVENTOR
John B. Fulton,

ATTORNEYS

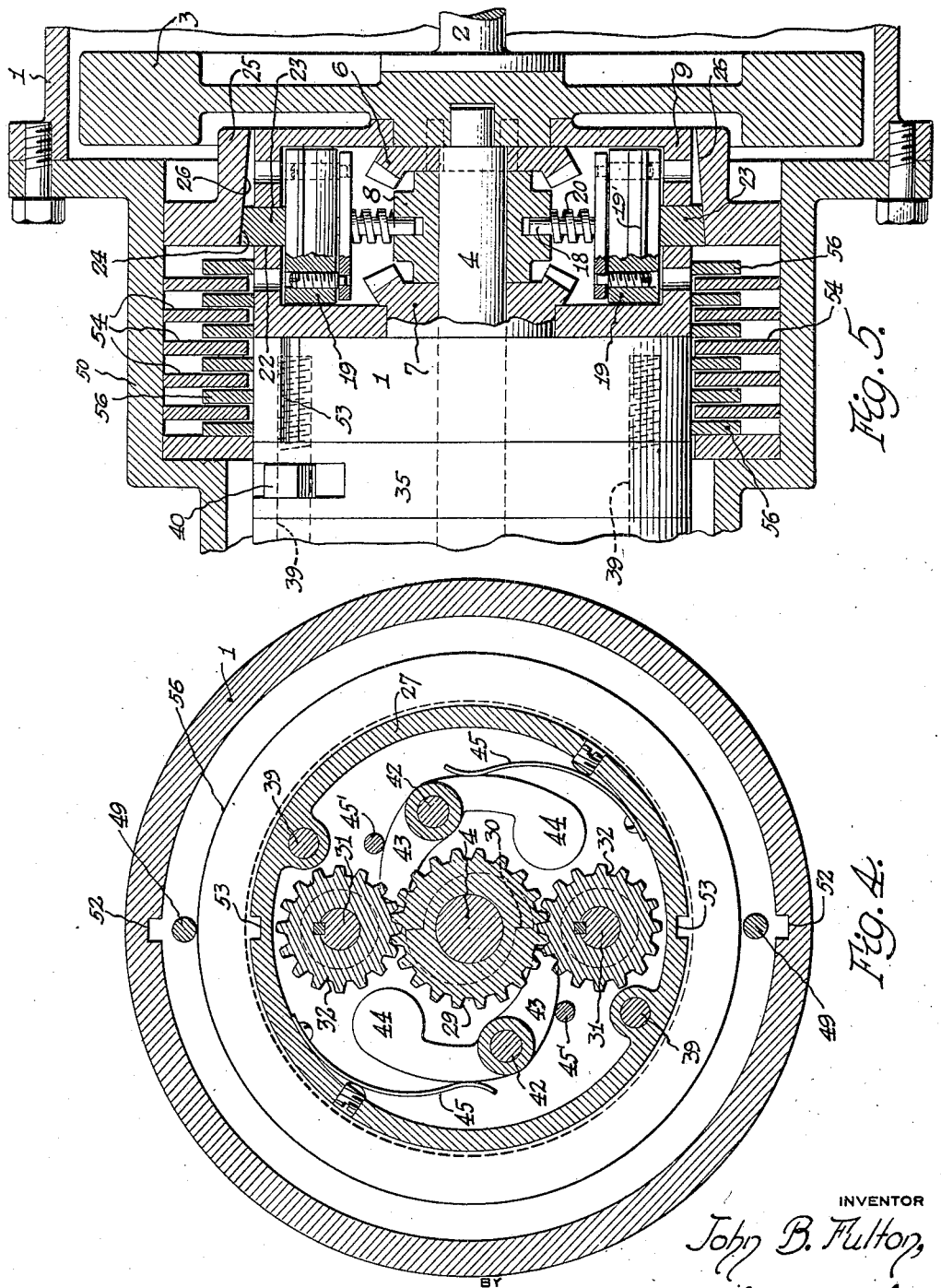

Patented Mar. 8, 1932

1,848,216

UNITED STATES PATENT OFFICE

JOHN B. FULTON, OF HIGHLAND PARK, MICHIGAN

AUTOMATIC TRANSMISSION MECHANISM

Application filed December 4, 1930. Serial No. 500,018.

The present invention pertains to an automatic transmission mechanism designed particularly for use in connection with motor vehicles although applicable to other machines.

The principal object of the invention is to provide a transmission mechanism adapted to shift from a low speed to a higher speed, without the use of a gear shift lever, when the driven shaft attains a given velocity. This object is accomplished by utilizing the momentum and velocity of the driven shaft to act centrifugally on a dog or dogs to change the gear relation. More specifically, the driven shaft is allowed to run at a higher rate than the driving member by slowing down the motor or releasing the clutch after the driven shaft has acquired the necessary velocity and momentum. The aforementioned dogs merely ride over corresponding stops on the constant mesh pinion while the driven shaft is travelling faster than this pinion, but when the pinion equals or slightly exceeds the speed of the driven shaft, the stops engage the dogs and cause them to be driven from the constant mesh pinion. In this manner there is established a gear relation different from that existing in the initial or low gear, and this change relation results in high speed or direct drive from the drive shaft to the driven shaft.

The invention further includes novel mechanism for controlling the clutch. Reverse speed is obtained through another clutch system which functions initially as a brake if operated while the transmission mechanism is running in forward direction, and this clutch system is operated by the same mechanism which controls the main clutch.

The invention is fully disclosed by way of example in the following description and in the accompanying drawings, in which—

Figure 1:
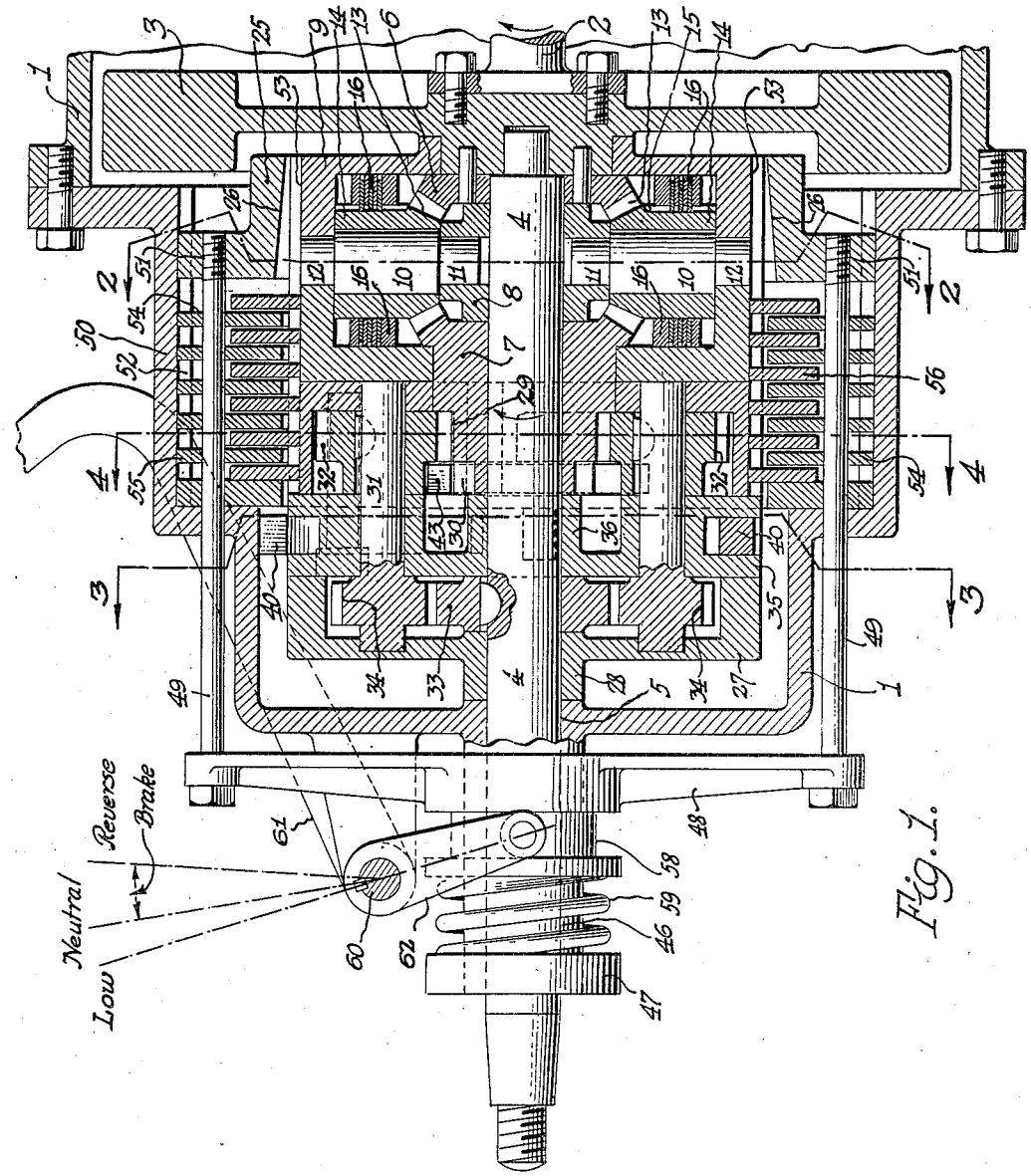
Figure 2:
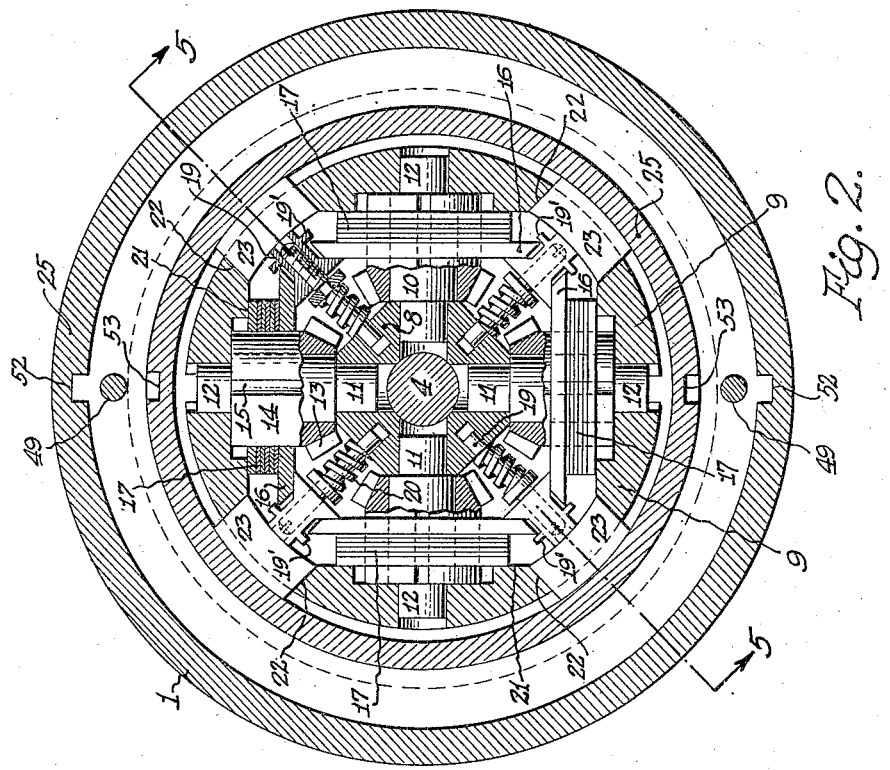
Figure 3:
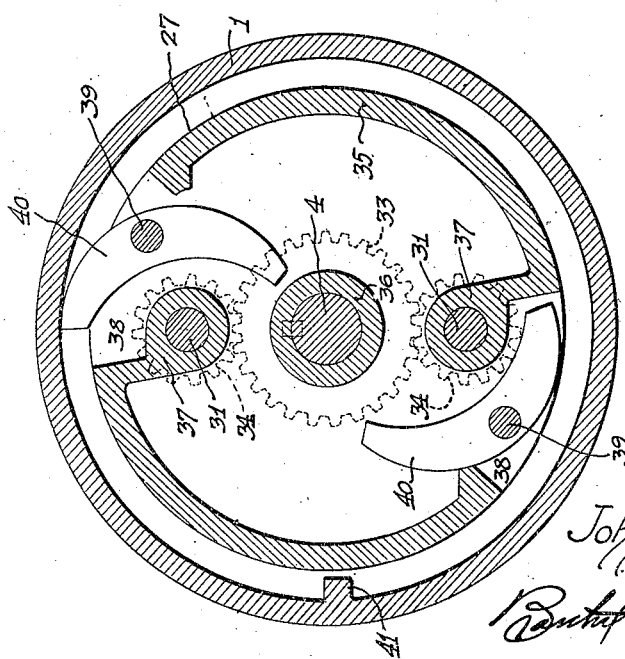

Figure 1 is a longitudinal section of the device;

Figs. 2, 3 and 4 are sections on the lines 2—2, 3—3 and 4—4 of Fig. 1; and

Fig. 5 is a section on the line 5—5 of Fig. 2.

Reference to these views will now be had by use of like characters which are employed to designate corresponding parts throughout.

The mechanism is enclosed within a suitable fixed housing 1 supported by the machine or vehicle in any appropriate or conventional manner. The drive or motor shaft 2 is illustrated in Fig. 1 and has secured thereto a flywheel 3. In the hub of the flywheel is journalled one end of the propeller or driven shaft 4, the other end of which is journalled as at 5 in the end wall of the fixed housing 1.

To the hub of the flywheel 3 is also secured a differential pinion 6 surrounding the shaft 4 and geared to an oppositely facing pinion 7 loosely mounted on the shaft 4 as will presently appear. Between the pinions 6 and 7, the shaft is surrounded by a multiple bearing block 8 as shown more clearly in Fig. 5. A drum 9, which will be identified as the clutch drum, encloses the pinions 6 and 7 at the corresponding end of the shaft 4 and is mounted on the hub of the flywheel 3 and the body of the pinion 7 for relative movement thereon as clearly illustrated in Fig. 1. In the bearing block 8 between the pinions 6 and 7 are journalled the inner ends 11 of stub shafts 10, the remaining ends 12 of which are journalled in the peripheral wall of the clutch drum 9 as may clearly be seen in Figs. 1 and 2. On the members 10 are loosely mounted intermediate differential pinions 13 which complete the gear train between the pinions 6 and 7.

Each of the pinions 13 has a somewhat elongated body portion 14 formed with a longitudinal groove 15. Each body portion 14 is surrounded by a clutch plate 16 on which are mounted superposed clutch disks 17 having portions extending into the groove 15, as shown in Fig. 1, in order to turn with the intermediate pinions when otherwise free. Between the several shafts 10 are mounted stems 18 having their inner ends journalled in the block 8 and their upper ends equipped with heads 19 adapted to engage the inner faces of the clutch plates 16. Each stem is surrounded by a spring 20 tending to move the same outwardly and thus compress the clutch disks 17 against suitable stops 21 formed on the drum 9, thereby holding the clutch assembly in engaged position wherein the intermediate differential pinions 13 are locked against rotation (on their axes) as distinguished from revolution (on an external axis). The peripheral wall of the drum 9 is formed with slots 22 opposite the heads 19, and each such slot receives a slidable block 23 having its inner face in engagement with the adjacent head and its outer face sloped as indicated by the numeral 24 in Fig. 5. The drum 9 is surrounded by a clutch-operating ring 25 having a conical inner face 26 engaging the sloped faces 24 as also shown in Fig. 5. By adjustment or longitudinal shifting of the ring 25 by the means presently to be described, the clutch mechanism may be released against the tension of the springs 20 or engaged under the influence of the springs. Each head 19 also carries a shoulder 19' at the outer surface of the adjacent base plates 16. On depression of the stems 18 to release the clutches, the shoulders 19' positively hold the heavier members 16 in released position and prevent them from being moved outwardly to bind the clutch disks under centrifugal action during rotation of the bearing block 8 and drum 9.

Adjacent the clutch drum is a transmission drum 27 which, although consisting of two or more sections, is so assembled that it moves bodily as one member. The forward end of this drum is journalled on the pinion 7, and the rear end is formed with a bearing 28 surrounding the shaft 4. Integral with the pinion 7 is formed a constant mesh pinion 29 which is disposed within the drum 27 as shown in Fig. 2. The extremity of this member within the drum 27 is further formed with a air of stops or faces 30 which face in the clockwise direction as indicated by dotted lines in Fig. 4.

Between the end walls of the drum 27 are journalled spindles 31 sufficient in number for the desired purpose, although one such spindle may conceivably be used insofar as the operation of the device is concerned. In connection with the construction of the drum of several parts, it will be seen that the spindles hold the parts together against relative shifting as already stated. On the forward end of each spindle is keyed a planetary pinion 32 meshing with the constant mesh pinion 29. Inwardly of the wall of the drum 27, the shaft 4 as fixed thereto a final drive gear or pinion 33 meshing with another series of planetary pinions 34 fixed or formed at the remaining ends of the spindles 31.

Between the end sections of the drum 27 is an intermediate section 35 formed with a hub 36 loosely surrounding the shaft 4 for centering purposes and also formed with the bosses 37 enclosing the spindles 31. This member has peripheral openings 38 in which are secured pins 39 for the mounting of dogs 40. On initial counter-clockwise movement of the drum 27, these dogs engage with a stop 41 formed on the housing 1 to prevent further turning of the drum in this direction, while in the clockwise rotation of the drum, the dogs merely ride over the stop 41.

The drum 27 further carries pins 42 adjacent the constant mesh pinion 29, as shown in Fig. 4, and on these pins are mounted rocker members each formed at one end in the nature of a dog or pawl 43 adapted to be engaged by the adjacent stop or face 30. The remaining end is formed as a weight 44 adapted to be thrown outwardly by centrifugal force when the drum 27 attains a sufficiently high rate of rotation, whereupon the dogs 43 are thrown into position for engagement with the stops or faces 30. The ends 44 however are engaged by springs 45 secured to the drum for the purpose of normally holding the dogs in an inoperative position with respect to the face 30, and the outward movement of the dogs under the action of the springs is limited by pins 45' carried by the drum.

The bearing 5 at the rear end of the fixed housing 1 is extended externally at 46 and formed at its free end with a shoulder 47. On the portion 46 is slidably mounted a yoke 48 to which are anchored the ends of rods 49 passing through an enlarged portion 50 of the housing 1 and finally secured to the clutch-operating ring 25 as indicated by the numeral 51 in Fig. 1. The enlarged portion 50 has its inner wall formed with key slots 52, while the outer wall of the drum 9 and a portion of the outer wall 27 are formed with similar slots 53 adapted to lie directly opposite the slots 52 as may be seen by reference to Figs. 1 and 4. Associated with the outer slot 52 is a set of clutch rings 54 loosely surrounding the drums 9 and 27 and having suitably shaped lugs 55 slidably received in the slot 52. The arms 49 pass through these rings. In like manner, a co-operating set of clutch rings 56, alternating with the rings 54, surrounds the drums 9 and 27. These rings are free from the housing portion 50 and rods 49 and are formed with lugs 57 slidably received in the slots 53. It will also be seen that the several clutch rings lie between the ring 25 and the rear end of the enlargement 50.

The yoke 48 has a grooved hub 58 engaged by a spring 59 bearing against the shoulder 47 whereby normally to move the yoke 48, rods 49 and ring 25 forwardly or to the right with reference to Fig. 1. Adjacent the hub is an independent rocker shaft 60 perpendicular thereto and having a suitable operating member 61 such as a pedal or lever keyed thereto. Extending from the rocker shaft 60 is a shifting fork or similar member 62 extending into the groove of the hub 58, whereby the yoke 48 and associated parts may be displaced by actuation of the operating member 61.

The operation of the device will now be described. Assuming that the engine shaft 2 is turned from a position of rest in clockwise direction as indicated by the arrow in Fig. 1, the first differential gear 6 will obviously be turned in the same direction. Let it be also assumed that the clutch disks 17 are in engaged position whereby they hold the intermediate differential pinions 13 against rotation. Intermediate pinions are therefore revolved bodily with the drum 9, so that the opposite differential gear 7 and the constant mesh gear 29 are also turned clockwise. The pinions 32 are turned counter-clockwise by the constant mesh gear 29, and hence the spindle 31 and pinions 34 also rotate and revolve counter-clockwise, tending to turn the drum 27 counter-clockwise. The drum, however, is stopped as soon as one of the dogs 40 engages the stop 41 on the fixed housing 1, as may be seen by reference to Fig. 3. Inasmuch as the spindles 31 are thus arrested in revolution, the counter-clockwise rotation thereof and of the pinions 34 imparts a clockwise movement to the final drive gear 33 and the propeller shaft 4. It will be understood that clockwise rotation of the shaft 4 results in forward movement of the vehicle or machine operated thereby. The driving relation established between the gears 29 and 33 through the pinions 32 and 34 is the low speed.

In order to effect an automatic shift into second or high speed, the motor may be slowed down or the clutch disks 17 released. The former will be considered first. In slowing down the motor, the momentum of the machine drives the shaft 4 from the rear or normally driven end thereof. In the case of a motor vehicle, the drive is initiated at the rear wheels, and the speed of the shaft 4 is increased in approximately the ratio 3:1 which is the gear ratio at the rear end differential. In any event, the shaft 4 travels faster than the motor shaft 2 and constant mesh gear 29 when the motor is allowed to slow down.

The momentum or driving force on the shaft 4 turns the final drive gear 33 in clockwise direction and tends to rotate the spindles 31 in counter-clockwise direction. Such movement of the spindles without an accompanying movement of the drum 27 is impossible due to the fact that the different speeds and gear ratios at the gears 33 and 29 have a tendency to turn the pinions 34 and 32 at different speeds, and this also is impossible because both pinions are fixed to the spindles. Consequently the spindles are revolved bodily around the shaft 4 in clockwise direction with the gear 33, carrying with them the drum 27 to which they are attached.

The clockwise rotation of the drum 27 in the manner described is the beginning of the gear shifting interval. In clockwise turning of the drum 27, the dogs 40 ride over the stop 41 as clearly shown in Fig. 3.

The drum soon gains sufficient velocity to draw the weights 44 outward and the dogs 43 inward into engagement with the stop portion of the constant mesh gear 29, but the dogs merely ride over the stop members while the drum is rotating at a higher rate than the motor or gear 29. During this time, the differential action between the pinions 32 and 34 manifests itself in a counter-clockwise rotation of the spindles 31. The speed of the shaft 4 and drum 27 gradually slows down until it is equal or slightly below that of the gear 27, whereupon the stop faces 30 come into contact with the dogs 43 to drive the same and the drum 27. This is the end of the gear shifting interval and the beginning of the high speed interval. The driving engagements of the faces 30 against the dogs 43 hold the latter in engaged position independently of the centrifugal force acting on the weights 44. While the drum 27 is thus driven directly from the constant mesh gear 29 at motor speed, the spindles 31 are locked against rotation (for both ends cannot simultaneously turn at different speeds) and hence revolve bodily around the shaft 4. The pinions 32 and 34 thus serve to lock the final drive gear 33 to the constant mesh gear 29, whereupon the shaft 4 is driven at the same speed as the gear 29 and the motor, so that a direct drive from the motor shaft 2 to the driven shaft 4 is established.

The shift may also be effected by releasing the clutch disks 17. This is accomplished by downward pressure on the member 61, whereby the clutch ring 25 is drawn over and depresses the blocks 23 to remove the spring tension against the clutch plates 16. The intermediate differential pinions 13 are now free to rotate, whereupon the differential gear 7 and constant mesh gear 29 are turned oppositely to the differential gear 6 which turns clockwise. The shaft 4, having gained considerable momentum as already described, turns the final drive gear 33 in clockwise direction. Inasmuch as both ends of the spindles 31 cannot be turned in opposite directions by the oppositely turning gears 29 and 33, the drum 27 is rotated clockwise around the shaft 4, and the effect of this movement is as described above.

The transmission mechanism is brought into neutral position by the aforementioned release of the clutch disks 17. If there is any appreciable resistance to the turning of the shaft 4, as when the machine or automobile is at rest, the intermediate differential pinions 13 will merely idle around the pinion 7. It will be seen in Fig. 1 that there is considerable space between the clutch-operating ring 25 and the clutch ring 56 nearest thereto, and this distance is sufficient to permit release of the clutch disks before the ring 25 engages the first clutch ring 56.

In order to reverse or brake the motion of the shaft 4, the member 61 is depressed beyond the neutral boss thereof so that the ring 25 presses the rings 54 and 56 into firm frictional engagement with each other. Both drums 9 and 27 are thus locked to the fixed housing 1. During engagement of the clutch rings 54 and 56, the operating ring 25 holds the clutch disks 17 in released position, wherein the intermediate differential pinions 13 are free and the differential gear 7 and constant mesh gear 29 are turned counter-clockwise. Since the drum 27 is held stationary, the spindles 31 are rotated in clockwise direction from the gear 29 and impart through the pinions 34 and final drive gear 33 a counter-clockwise or reverse direction to the shaft 4. It will be apparent that the reversal of the shaft 4 from said speed is initially a braking action on the shaft.

Although a specific embodiment of the invention has been illustrated and described, it will be understood that various alterations in the details of construction may be made without departing from the scope of the invention as indicated by the appended claims.

What I claim is:—

1. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear.

2. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear, a fixed housing enclosing said drum, a stop on said housing, and another dog carried by said drum and adapted to engage said stop on rotation of said drum oppositely to said constant mesh gear.

3. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, and differential gearing between said shaft and constant mesh gear.

4. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, and a centrifugally operated dog carried by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, opposed differential gears fixed thereto and to said constant mesh gear respectively, a carrier loosely surrounding said differential gears, differential pinions journalled in said carrier and engaging said differential gears, and means for locking said differential pinions against rotation.

5. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, clutch disks keyed to said differential pinions, and means for locking said disks to said carrier.

6. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, clutch disks keyed to said differential pinions, and means for locking said disks to said carrier.

7. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, clutch disks keyed to said differential pinions, spring means normally tending to lock said disks to said carrier, and operating means for withdrawing said spring means from said disks.

8. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, and means for simultaneously locking said drum and carrier against rotation, whereby said driven shaft is driven oppositely to said drive shaft.

9. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carrier by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, and means for simultaneously locking said drum and carrier to said fixed housing, whereby said driven shaft is driven oppositely to said drive shaft.

10. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, clutch disks keyed to said differential pinions, means for normally locking said clutch disks to said carrier, co-operating clutch members carried by said drum, carrier and housing for simultaneously locking the drum and carrier to said housing, whereby said driven shaft is driven oppositely to said drive shaft, and operating means adapted to release said clutch locking means and to bring said clutch members into mutual engagement.

11. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, clutch disks keyed to said differential pinions, means for normally locking said clutch disks to said carrier, co-operating clutch rings carried by said drum, carrier and housing for locking said drum and carrier to said housing, whereby said driven shaft is driven oppositely to said drive shaft, and a clutch-operating ring adapted to release said clutch locking means and to bring said clutch members into mutual engagement.

12. An automatic transmission mechanism comprising a constant mesh gear, a driven shaft, a final drive gear fixed thereto, a drum loosely mounted on said shaft at said drive gear, a spindle journalled in said drum, pinions fixed to said spindle and meshing respectively with said gears, a stop carried by said constant mesh gear, a centrifugally operated dog carried by said drum and positioned to engage said stop on rotation of said drum in the same direction as said constant mesh gear, a fixed housing enclosing said drum, a stop on said housing, another dog carried by said drum and adapted to engage said stop on rotation of said drum oppositely to said constant mesh gear, a drive shaft, opposed differential gears fixed thereto and to said constant mesh gear respectively, a carrier loosely surrounding said differential gears, differential pinions journalled in said carrier and engaging said differential gears, means for locking said differential pinions against rotation, clutch disks keyed to said differential pinions, means for normally locking said clutch disks to said carrier, co-operating clutch rings carried by said drum, carrier and housing for locking said drum and carrier to said housing, whereby said driven shaft is driven oppositely to said drive shaft, and a clutch-operating ring having a sloped face adapted to engage said clutch locking means to release the same from said clutch disks on movement towards said clutch rings and positioned to press said clutch rings together on continued movement in the same direction.

In testimony whereof I affix my signature.

JOHN B. FULTON.